(12) United States Patent
Sivabalan et al.

(10) Patent No.: US 7,345,994 B2
(45) Date of Patent: Mar. 18, 2008

(54) TRANSPARENT RE-ROUTING OF MPLS TRAFFIC ENGINEERING LSPS WITHIN A LINK BUNDLE

(75) Inventors: Muthurajah Sivabalan, Kanata (CA); Rakesh Gandhi, Kanata (CA); Sami Boutros, Kanata (CA); Jean Philippe Vasseur, Dunstable, MA (US)

(73) Assignee: Cisco Technology, Inc., San Jose, CA (US)

( * ) Notice: Subject to any disclaimer, the term of this patent is extended or adjusted under 35 U.S.C. 154(b) by 911 days.

(21) Appl. No.: 10/689,385

(22) Filed: Oct. 20, 2003

(65) Prior Publication Data

US 2005/0083928 A1    Apr. 21, 2005

(51) Int. Cl.
*H04L 12/56* (2006.01)
(52) U.S. Cl. ...................................... 370/228
(58) Field of Classification Search ........ 370/216–228, 370/351–401, 409, 430
See application file for complete search history.

(56) References Cited

U.S. PATENT DOCUMENTS

| 6,337,846 | B1 | 1/2002 | Bengston et al. | |
|---|---|---|---|---|
| 6,507,561 | B1 | 1/2003 | Baniewicz et al. | |
| 7,126,907 | B2 * | 10/2006 | Carpini et al. | 370/218 |
| 2002/0060985 | A1 | 5/2002 | Lee et al. | |
| 2003/0043792 | A1 | 3/2003 | Carpini et al. | |
| 2003/0152024 | A1 | 8/2003 | Yang et al. | |
| 2004/0052207 | A1 * | 3/2004 | Charny et al. | 370/216 |
| 2004/0125745 | A9 * | 7/2004 | Dang et al. | 370/217 |

OTHER PUBLICATIONS

Kompella et al., Link Bundling in MPLS Traffic Engineering, Jan. 2003, draft-ietf-mpls-bundle-04.txt, pp. 1-9, especially pp. 2-4.*
Awduche et al., "RSVP-TE: Extensions to RSVP for LSP Tunnels", RFC 3209, Internet Engineering Task Force, Dec. 2001.
Awduche et al., "Requirements for Traffic Engineering Over MPLS", RFC 2702, Internet Engineering Task Force, Sep. 1999.
Berger, "Generalized Multi-Protocol Label Switching (GMPLS) Signaling Resource ReserVation Protocol-Traffic Engineering (RSVP-TE) Extensions", RFC 3473, Internet Engineering Task Force, Jan. 2003.

(Continued)

*Primary Examiner*—Derrick W. Ferris
*Assistant Examiner*—Louis Bell
(74) *Attorney, Agent, or Firm*—Cindy Kaplan (57) ABSTRACT

Local rerouting around a failed component link of a link bundle is provided by immediately substituting one or more other component links of the same link bundle. The substitution of component links is performed at the point of failure without signaling to other nodes. This minimizes signaling traffic particularly when large numbers of LSPs are impacted by a single component link failure. Also, since LSP repair can be accomplished very quickly, traffic disruption is minimized.

22 Claims, 6 Drawing Sheets

OTHER PUBLICATIONS

Braden et al., "Resource ReSerVation Protocol (RSVP)—Version 1 Functional Specification", RFC 2205, Internet Engineering Task Force, Sep. 1997.

Kompella et al., "Link Bundling in MPLS Traffic Engineering", Internet Draft, Internet Engineering Task Force, Jul. 2002.

Le Faucheur et al., "Requirements for Support of Differentiated Services-aware MPLS Traffic Engineering", RFC 3564, Internet Engineering Task Force, Jul. 2003.

Pan et al., "Fast Reroute Extensions to RSVP-TE for LSP Tunnels", Internet Draft, Internet Engineering Task Force, Oct. 2001.

Rosen et al., "Multiprotocol Label Switching Architecture", RFC 3031, Internet Engineering Task Force, Jan. 2001.

* cited by examiner

TRANSPARENT RE-ROUTING OF MPLS TRAFFIC ENGINEERING LSPS WITHIN A LINK BUNDLE

BACKGROUND OF THE INVENTION

The present invention relates to data networking and more particularly to systems and methods for providing fault tolerance to data networks.

MPLS (Multi-Protocol Label Switching) Traffic Engineering has been developed to meet data networking requirements such as guaranteed available bandwidth. MPLS Traffic Engineering exploits modern label switching techniques to build guaranteed bandwidth end-to-end circuits through an IP network of label switched routers (LSRs). These circuits are a type of label switched path (LSP) and thus generally referred to as MPLS Traffic Engineering LSPs.

MPLS Traffic Engineering LSPs traverse a series of nodes and links that interconnect them. MPLS Traffic Engineering protocols define a link to be a logical construct that represents physical resources that interconnect label switched routers. The information about a particular link including the available link bandwidth is used in determining the routes of LSPs and signaling their establishment.

A single pair of nodes may be connected by a number of links including both physical links and logical links, i.e., logical connections through a network such that the nodes are considered adjacent for MPLS Traffic Engineering purposes. To place LSPs, MPLS Traffic Engineering relies on conventional Internet link state routing protocols such as OSPF and IS-IS that require each node to report information about all of its directly connected nodes to all nodes in the network.

To avoid the need to advertise information about each link between a pair of nodes, the concept of a "link bundle" has been developed to support MPLS Traffic Engineering. A link bundle combines multiple links between a pair of nodes. The links that make up a bundle are then referred to as "component links." Link bundling improves routing scalability by reducing the amount of information that has to be advertised by link state routing protocols to support signaling and computation of MPLS Traffic Engineering LSPs. Information about link bundles including bandwidth information is flooded throughout the network while information about component links is maintained only at the directly connected nodes. Details of link bundling are described in Kompella, et al., "Link Bundling in MPLS Traffic Engineering," IETF Internet Draft, July 2002, the contents of which are herein incorporated by reference in their entirety for all purposes.

In the signaling traffic used to establish an LSP, only the link bundle is identified. An LSP head-end is unaware of individual component links of link bundles connected to other nodes along the LSP. However, at the originating node of a link bundle, a local admission control mechanism assigns each LSP to a particular component link that satisfies the LSP's bandwidth requirement if such a component link is available.

An important aspect of MPLS Traffic Engineering reliability is addressing link failures in order to minimize traffic loss. When a component link fails, all LSPs passing through that component link are broken and must be rerouted. One protection mechanism provides that the failure will be signaled to the head-end of each affected LSP and the head-ends will react by rerouting the LSP to avoid the failed component link. Another protection mechanism referred to as Fast Reroute reduces the recovery time by providing for impacted traffic to be patched through a local backup tunnel around the failure. The Fast Reroute mechanism protects the impacted traffic until such time the head-end can reroute the LSP.

Whether or not Fast Reroute is operative for a particular impacted LSP, the end result of the head-end's rerouting of the LSP will often be that the LSP extends through the same link bundle but simply uses a different component link than the one that failed. A repair that is essentially entirely local in its effect thus requires a relatively large amount of signaling traffic along the LSP and delay during which packets are lost, especially if Fast Reroute mechanisms are not enabled. Since a single component link can carry numerous LSPs, a single component link failure can cause a very large amount of signaling and traffic disruption. What is need are systems and methods for minimizing signaling and traffic disruption for local repairs within link bundles.

SUMMARY OF THE INVENTION

Embodiments of the present invention provide for local rerouting around a failed component link of a link bundle by immediately substituting one or more other component links of the same link bundle. The substitution of component links is performed at the point of failure without signaling to other nodes. This minimizes signaling traffic particularly when large numbers of LSPs are impacted by a single component link failure. Also, since LSP repair can be accomplished very quickly, traffic disruption is minimized.

One aspect of the present invention provides a method for operating a first node in a label switched network. The method includes: establishing a link bundle comprising a plurality of component links between the first node and a second node, upon establishment of an LSP including the first node and the second node, selecting a first component link of the link bundle as a primary component link to assign to the LSP, selecting one or more component links of the link bundle other than the first component link as one or more secondary component links to assign to the LSP, sending traffic of the LSP over the primary component link until a failure of the primary component link, and, after failure of the primary component link, sending traffic of the LSP over the one or more secondary component links instead of the primary component link.

Further understanding of the nature and advantages of the inventions herein may be realized by reference to the remaining portions of the specification and the attached drawings.

DESCRIPTION OF SPECIFIC EMBODIMENTS

The present invention will be described with reference to a representative network environment that employs a certain combination of network protocols to forward data through the network. The network includes a set of nodes interconnected by links. Certain nodes are interconnected by multiple links that are aggregated together into link bundles. The links and component links may be implemented using any type of physical medium such as e.g., an optical medium, a wireless medium, twisted pair, etc. Links and component links may also be logical connections that give the connected nodes the property of adjacency in view of the operative networking protocols.

In one embodiment, the nodes of such a network interoperate in a manner specified by various protocols including e.g., TCP/IP and protocols defined by the following documents:

E. Rosen, et al., "Multiprotocol Label Switching Architecture," RFC 3031, Internet Engineering Task Force, January 2001.

Braden, et al. "Resource ReSerVation Protocol (RSVP)-Version 1 Functional Specification," RFC 2205, Internet Engineering Task Force, September 1997.

Awduche, et al., "Requirements for Traffic Engineering Over MPLS," RFC 2702, Internet Engineering Task Force, September 1999.

Berger, et al., "Generalized MPLS Signaling—RSVP-TE Extensions," RFC 3473, Internet Engineering Task Force, January 2003.

Le Faucheur, et al., "Requirements for Support of Diff-Serv-Aware MPLS Traffic Engineering," RFC 3564, Internet Engineering Task Force, July 2003.

Awduche, et al., "RSVP-TE: Extensions to RSVP for LSP Tunnels," RFC 3209, Internet Engineering Task Force, December 2001.

Pan, et al. "Fast Reroute Extensions to RSVP-TE for LSP Tunnels," Internet Draft, Internet Engineering Task Force, expires December 2003.

Kompella, et al., "Link Bundling in MPLS Traffic Engineering," Internet Draft, Internet Engineering Task Force, expires January 2003.

The contents of the above protocol documents are all herein incorporated by reference in their entirety for all purposes. Other suitable protocols as known in the art may also be implemented by nodes of the example network.

In one embodiment, the nodes of the example network are IP routers that implement multiprotocol label switching (MPLS) and operate as label switched routers (LSRs). In one simple MPLS scenario, at the ingress to the network, a label is assigned to each incoming packet based on its forwarding equivalence class before forwarding the packet to the next hop node. At each intermediate node, a forwarding selection and a new substitute label are determined by using the label found in the incoming packet as a reference to a label forwarding table that includes this information. At the network egress (or one hop prior), a forwarding decision is made based on the incoming label but no label is included when the packet is sent on to the next hop.

The paths taken by packets that traverse the network in this manner are preconfigured and referred to as label switched paths (LSPs). Establishment of an LSP requires computation of a path, signaling along the path, and modification of the above-mentioned forwarding tables along the path.

MPLS Traffic Engineering establishes LSPs that have guaranteed bandwidth. Each MPLS Traffic Engineering LSP thus has a bandwidth requirement. Sufficient bandwidth is reserved on each link and component link in the MPLS Traffic Engineering LSP to assure that the bandwidth guarantee is met. Bandwidth reserved on a link or component link for one LSP is not available for other LSPs.

MPLS Traffic Engineering reliability objectives require mechanisms for handling failures of network elements such as links and component links. Embodiments of the present invention provide for a local rerouting around a failed component link in a link bundle. Traffic on a failed component link can be shifted to one or more other component links of the same bundle without any signaling to and from the head-end of the LSP as required by prior art mechanisms.

Figure 1:
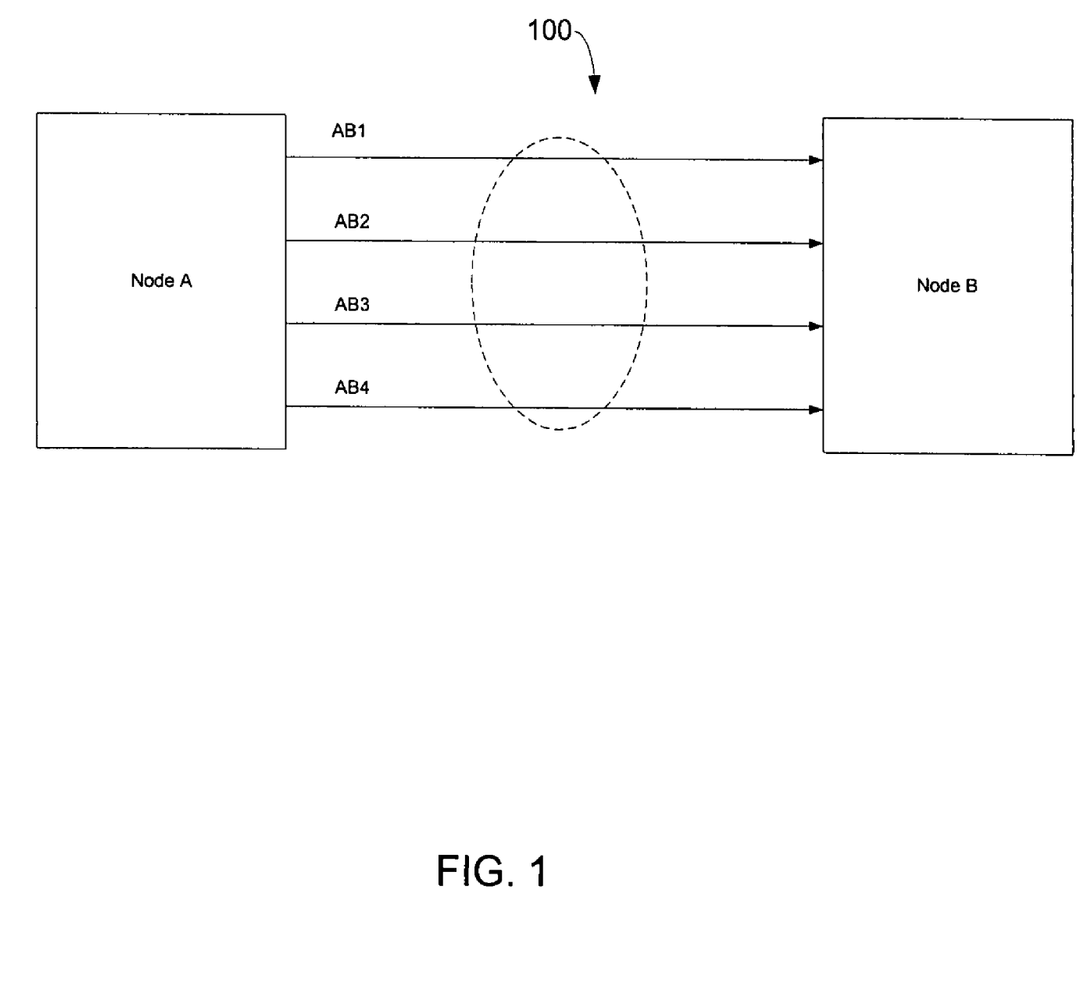
FIG. 1 depicts a link bundle interconnecting two nodes according to one embodiment of the present invention.

FIG. 1. depicts a representative link bundle scenario according to one embodiment of the present invention. Link bundle 100 interconnects nodes A and B. Link bundle 100 includes components links AB1, AB2, AB3, and AB4. Node A propagates information about the aggregate characteristics of link bundle 100 including the available aggregate bandwidth to other nodes in the network in accordance with the relevant link state routing protocols underlying MPLS Traffic Engineering operation. Information about the component links AB1, AB2, AB3, and AB4 is not distributed in this way but only maintained locally to node A. Node B has similar knowledge of the links extending in the reverse direction. Information requesting the establishment of an LSP through nodes A and B will thus specify link bundle 100 but not the constituent component links.

A local admission control mechanism at node A determines whether or not to accept the LSP and picks a component link for use by the LSP. The component link should have sufficient bandwidth available to support the LSP's requirements. The component link chosen in this fashion is called a "primary" component link. The admission control mechanism further selects one or more other component links as secondary component links. As will be explained below, the secondary component links are used as backup links when the primary component link fails. The secondary component link information is preconfigured into the label forwarding table entry for the LSP so that the switchover can occur very quickly.

Figure 2:
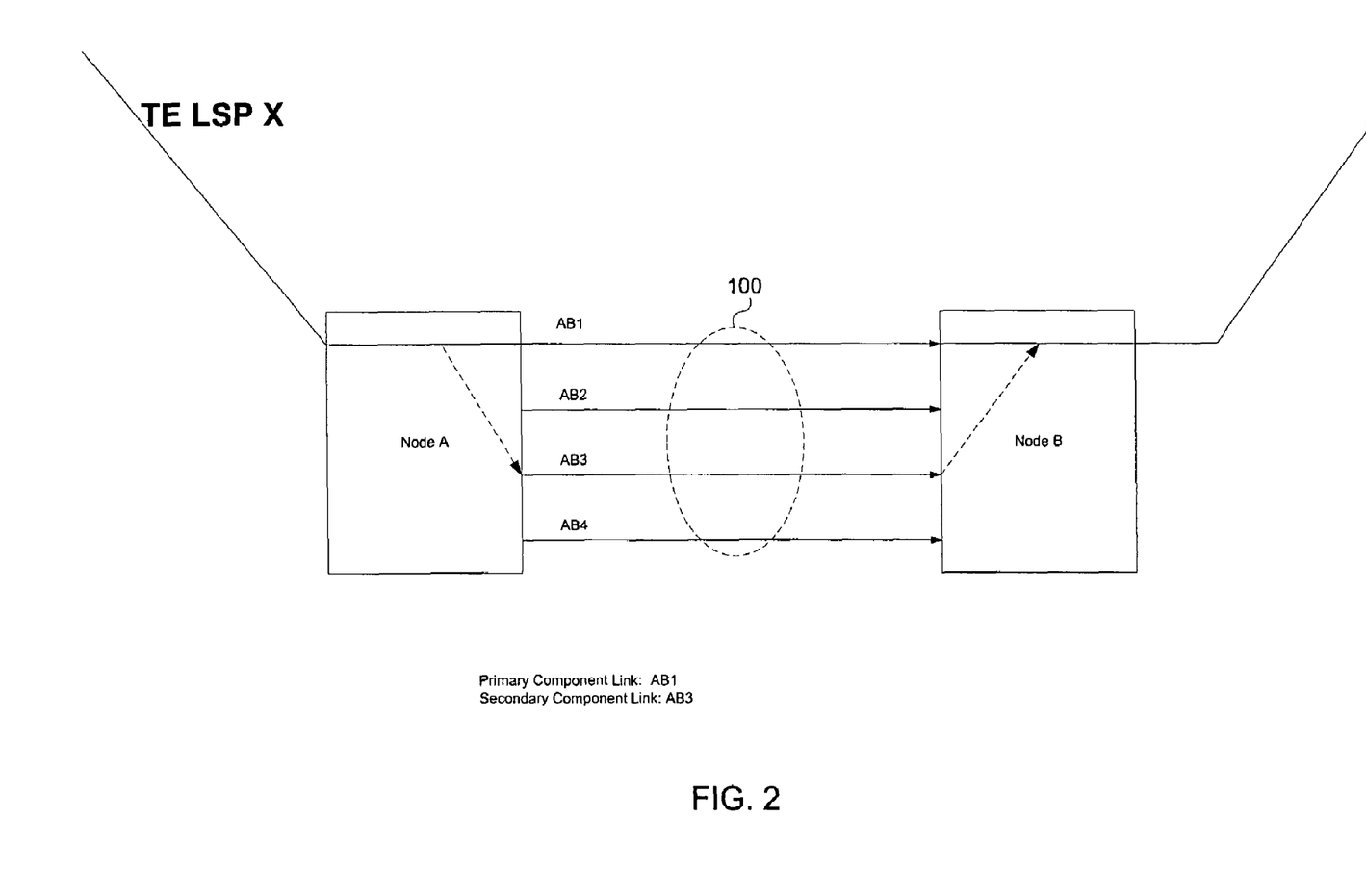
FIG. 2 depicts a first mode of component link protection according to one embodiment of the present invention.

According to embodiments of the present invention, an LSP placed on a link bundle can operate in one of two different modes:

In the first mode, a single secondary component link is assigned as backup for the primary component link. Sufficient bandwidth to accommodate the LSP is reserved on this single secondary component link. The amount of available bandwidth on the secondary component link is reduced accordingly. FIG. 2 illustrates an example of this first mode where an MPLS Traffic Engineering LSP X employs link bundle 100 between nodes A and B. Node A ties LSP X to a primary component link AB1 and a secondary component link AB3. Further details of this first mode of operation will be described with reference to FIG. 4.

Figure 3:
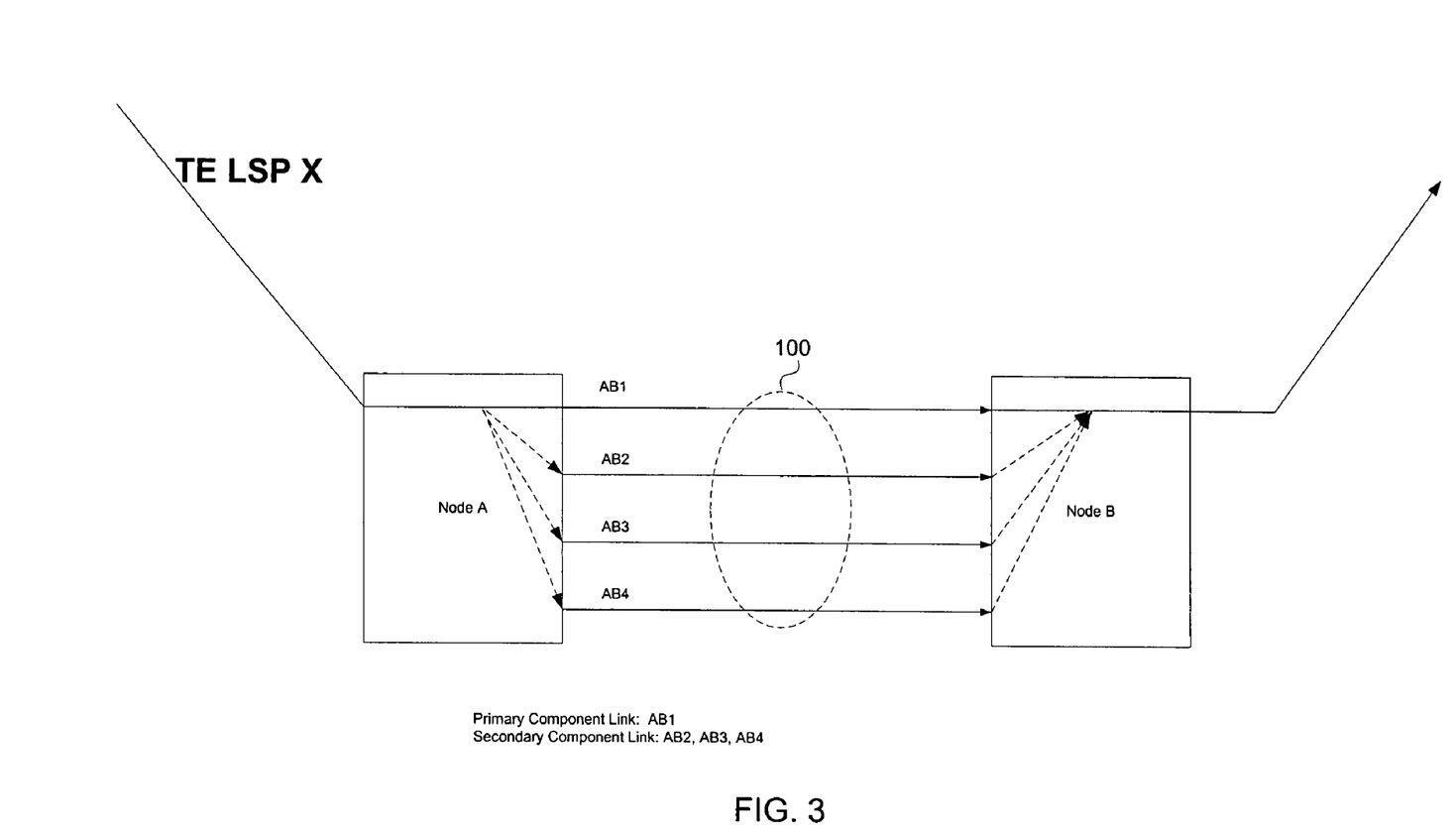
FIG. 3 depicts a second mode of component link protection according to one embodiment of the present invention.

In a second mode, one or more secondary component links are assigned to LSP X. Bandwidth is, however, not reserved on these secondary component links. This mode of operation is illustrated in FIG. 3 where LSP X is assigned to a primary component link AB1 and three secondary component links: AB2, AB3, and AB4. Further details of this second mode of operation will be described with reference to FIG. 5.

Figure 4:
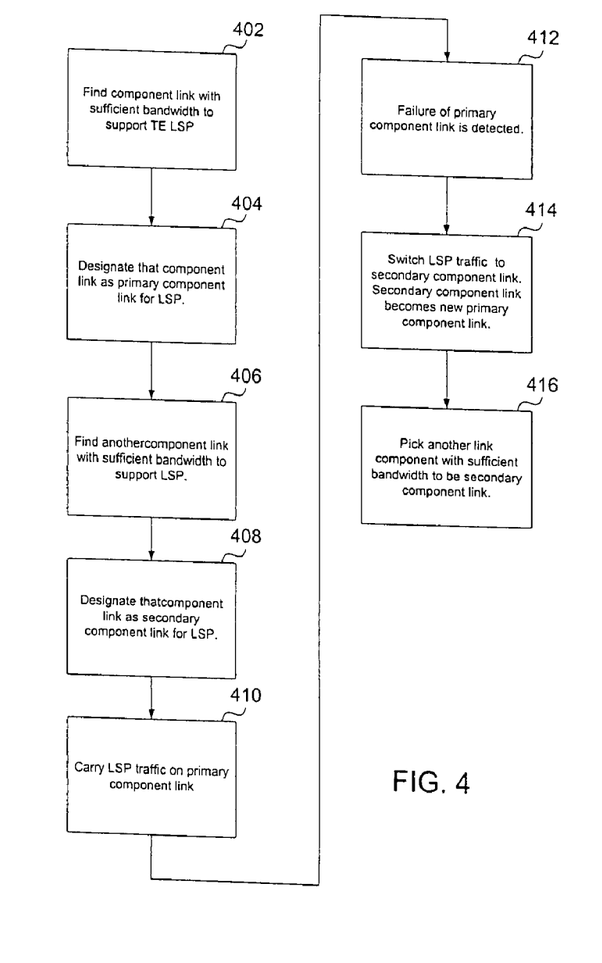
FIG. 4 is a flow chart describing steps of providing component link protection using the mode of FIG. 2 according to one embodiment of the present invention.

FIG. 4 is a flow chart describing steps of component link operation according to the first mode as provided by embodiments of the present invention. At step 402, node A receives a request to establish a Traffic Engineering LSP using link bundle 100. Node A identifies a component link with sufficient bandwidth to accommodate the requirements of this Traffic Engineering LSP. At step 404, this component link is designated as the primary component link for the LSP. At step 406, node A identifies another component link with sufficient bandwidth to support the LSP. This component link is designated at step 408 as the secondary component link for the LSP. Information about the primary and secondary component links is programmed into the label forwarding table entry or entries corresponding to the LSP. At step 410, packets belonging to the LSP are carried on the primary component link.

At step 412, failure of the primary component link is detected. The response is a switchover of the LSP traffic to the secondary component link at step 414. Quality of service is maintained since the secondary component link also has sufficient guaranteed bandwidth. There is no signaling to the head-end to implement the switch-over. The secondary component link now becomes the primary component link. At step 416, node A selects another component link in the same link bundle to be the new secondary component link.

If the secondary links with sufficient bandwidth cannot be found within the same link bundle, then protection is not available within the bundle. Conventional Fast Reroute mechanisms that employ backup tunnels that do not include the link bundle remain available as do LSP restoration mechanisms that require coordination with the head-end.

Figure 5:
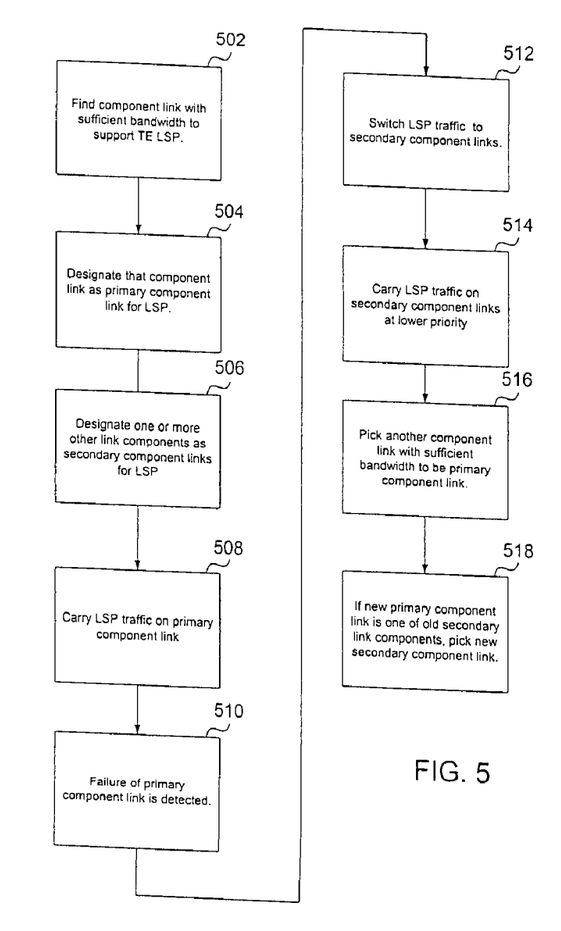
FIG. 5 is a flow chart describing steps of providing component link protection using the mode of FIG. 3 according to one embodiment of the present invention.

FIG. 5 is a flow chart describing steps of operating component link protection according to the second mode provided by embodiments of the present invention. When node A receives a request to establish a Traffic Engineering LSP, it responds at step 502 by finding a component link with sufficient bandwidth to support the LSP. At step 504 this component link is designated as the primary component link for that LSP. At step 506, one or more other component links are designated as secondary component links for the LSP. These designations are made without considering bandwidth requirements. The LSP's entry in the label forwarding table is modified to identify the designated primary and secondary component links. Then at step 508, traffic of the LSP is carried on the primary component link.

At step 510, node A detects failure of the primary component link. The LSP traffic is switched immediately, at step 512, to the one or more secondary component links. The LSP traffic is carried on the secondary component links at step 514, however, at a lower priority than other traffic carried by the secondary component links. In the case of multiple secondary links, the traffic from the broken LSP can be distributed along all the secondary component links. To prevent packet re-ordering for a given flow, the secondary component links can be chosen on a per-packet basis, e.g., based on hash of the packet's source and destination IP addresses. Strictly speaking, this per-packet selection of component links is a violation of the link bundling requirement that an LSP be pinned down to a single component link. However, this violation exists only for a short time limited by use of a timer mechanism as explained below.

A secondary component link for one LSP can be a primary component link for other LSPs. Since, in this second mode, bandwidth has not been allocated on the secondary component links, moving the traffic from a broken LSP over to a secondary component link may overload that component link and hence violate the quality of service level guaranteed to the unbroken LSPs placed on that component link. In MPLS networks that employ Differentiated Services (Diff-Serv) techniques, this undesirable situation can be avoided by subjecting the excess traffic due to failure of a component link to a special excess traffic Per Hop Behavior (PHB). This special PHB effectively demotes the quality of service level for packets that have been shifted between component links due to failure.

In a Diff-Serv scenario that divides traffic among different queues corresponding to different priority levels, the packets from broken LSPs are sent to a "best effort" queue which is given relatively low priority in selecting packets for transmission. An alternative Diff-Serv scenario employs weighted random early detection (WRED) to randomly drop packets in congested conditions with the dependence of drop probability on congestion being set independently for each PHB. The excess traffic PHB subjects packets from broken LSPs to a very aggressive WRED profile such that these packets have a relatively high probability of being dropped as congestion increases compared to other traffic.

This excess traffic PHB is applied at node A in the situation of FIG. 3. However, if the component links of link bundle 100 are logical connections that incorporate hops through other intermediate nodes, the packets subject to the excess traffic PHB will be appropriately marked so that the excess traffic PHB will be enforced at the intermediate nodes as well.

In the second mode, the use of multiple secondary component links is preferred because excess traffic on any one secondary component link is minimized. Packet loss on the rerouted LSP is also minimized in this way.

At step 516, node A picks another component link with sufficient bandwidth to support the LSP to be a replacement primary link. Traffic is shifted to this new primary component link. If the new primary component link is in fact one of the existing secondary component links, then a new secondary component link should be picked as a replacement. Otherwise the new primary component link is protected by the same set of secondary component links as the previous primary component link.

If a new primary component link cannot be found, however, the head-end of the broken LSP is signaled to initiate a rerouting of the LSP that does not include link bundle 100. This will be a soft preemption, i.e., such that the old LSP routing including link bundle 100 remains in operation until the new one that excludes link bundle 100 is operational. Traffic is thus forwarded over the secondary component links of link bundle 100 until the LSP is successfully rerouted. Provided that the head-end can find an alternative path, there is no traffic loss since rerouting was in effect during the failure.

At the time the head-end is signaled, a local timer is started. Upon receipt of the failure notification, the head-end will try to find an alternate path that excludes the bundle holding the failed component link. But finding such an alternate path is not guaranteed. If no alternate path is signaled, the local timer will eventually time out, causing the local node upstream from the failure (node A) to tear down the LSP using RSVP signaling procedures.

It will be appreciated then that embodiments of the present invention provide an efficient and simple mechanism for minimizing traffic loss in MPLS Traffic Engineering network using link bundles. The above-identified described mechanisms avoid unnecessary LSP rerouting from the head-end since rerouting can be accomplished locally. A large reduction in unnecessary signaling messages is also provided, especially when a single failed component link supports numerous LSPs. Protection within the link bundle may be supplemental to other protection mechanisms such as Fast Reroute.

Figure 6:
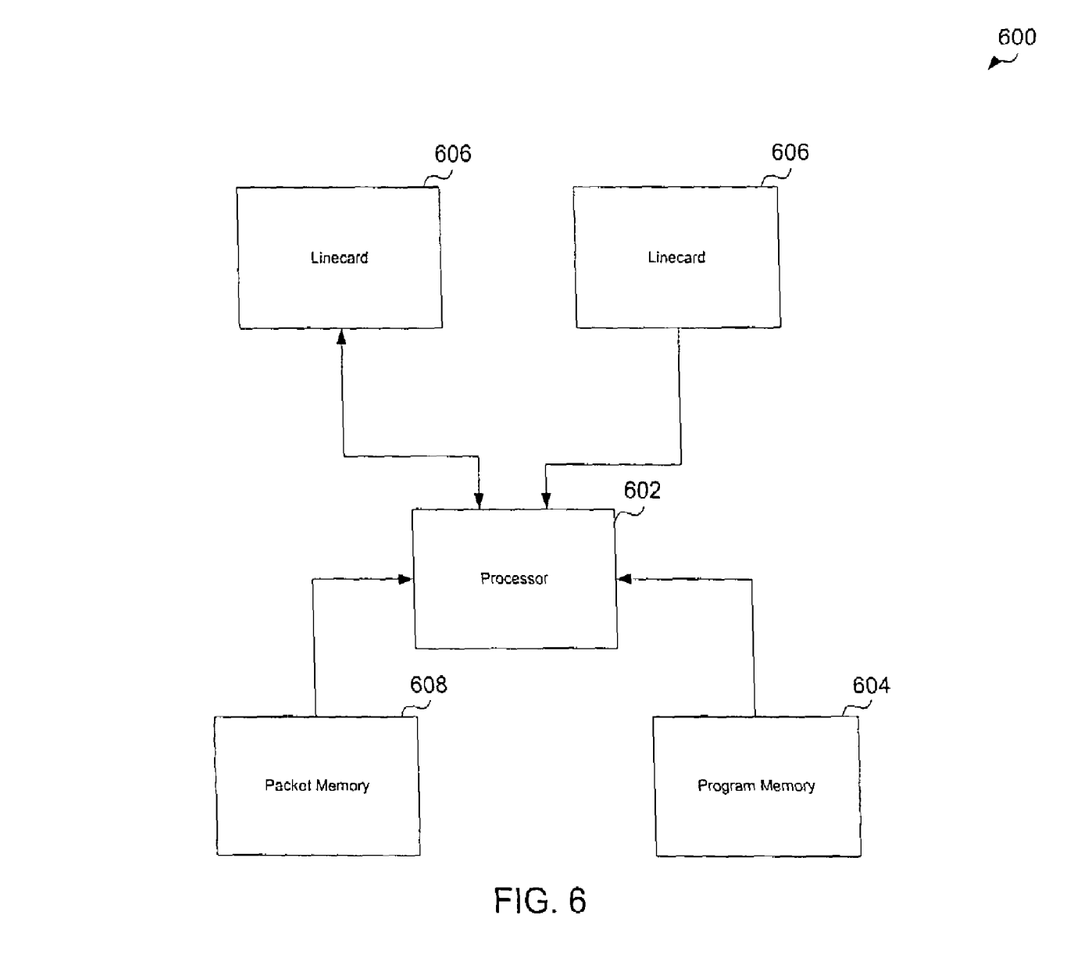
FIG. 6 depicts a network device useful in implementing embodiments of the present invention.

FIG. 6 depicts a network device 600 that may be used to implement, e.g., nodes A or B and/or perform any of the steps of FIGS. 4-5. In one embodiment, network device 600 is a programmable machine that may be implemented in hardware, software or any combination thereof. A processor 602 executes code stored in a program memory 604. Program memory 604 is one example of a computer-readable medium. Program memory 604 can be a volatile memory. Another form of computer-readable medium storing the same codes would be some type of non-volatile storage such as floppy disks, CD-ROMs, DVD-ROMs, hard disks, flash memory, etc. A carrier wave that carries the code across a network is another example of a computer-readable medium.

Network device 600 interfaces with physical media via a plurality of linecards 606. Linecards 606 may incorporate Ethernet interfaces, DSL interfaces, Gigabit Ethernet interfaces, 10-Gigabit Ethernet interfaces, SONET interfaces, etc. As packets are received, processed, and forwarded by network device 600, they may be stored in a packet memory 608. Network device 600 implements all of the network protocols and extensions thereof described above as well as the data networking features provided by the present invention.

In one implementation, control plane operations such as establishment of LSPs are controlled and signaled by processor 602 while forwarding tables are maintained on linecards 606. Packet forwarding operations according to the present invention may occur partially or completely within one of linecards 606 or be divided between the ingress and egress linecards encountered by a particular packet. To implement functionality according to the present invention, linecards 606 may incorporate processing and memory resources similar to those discussed above in connection with the network device as a whole.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A method for operating a first node in a label switched network, said method comprising:
    establishing a link bundle comprising a plurality of component links between said first node and a second node;
    upon establishment of an LSP including said first node and said second node, selecting a first component link of said link bundle as a primary component link to assign to said LSP;
    selecting one or more component links of said link bundle other than said first component link as one or more secondary component links to assign to said LSP;
    sending traffic of said LSP over said primary component link until a failure of said primary component link; and
    after failure of said primary component link, sending traffic of said LSP over said one or more secondary component links instead of said primary component link;
    wherein sending traffic of said LSP over said one or more secondary component links comprises assigning lower priority to traffic of said LSP compared to other traffic carried by said one or more secondary component links.

2. The method of claim 1 wherein information about aggregate characteristics of said link bundle is advertised by said first node to other nodes but information about characteristics of individual ones of said plurality of component links is not advertised.

3. The method of claim 1 wherein said one or more secondary component links comprise exactly one secondary component link.

4. The method of claim 3 wherein, in advance of said failure, bandwidth for use by said LSP is allocated on said exactly one secondary component link responsive to a bandwidth requirement of said LSP.

5. The method of claim 3 further comprising:
    while sending traffic of said LSP over said exactly one secondary component link, designating said exactly one secondary component link as a new primary component link and selecting a new secondary component link responsive to a bandwidth requirement of said LSP.

6. The method of claim 1 wherein no bandwidth is allocated on said one or more secondary component links for use by said LSP.

7. The method of claim 6 further comprising:
    while sending traffic of said LSP over said one or more secondary component links, selecting a component link of said link bundle as a new primary component link; and thereafter
    sending traffic of said LSP over said new primary component link.

8. The method of claim 7 further comprising:
    if said new primary component link is one of said one or more secondary component links, selecting a new secondary component link.

9. The method of claim 6 further comprising:
    while sending traffic of said LSP over said one or more secondary component links, searching for a component link of said link bundle to serve a new primary component link; and thereafter
    upon failure to identify a component link having sufficient available bandwidth to server as a new primary component link, signaling a head-end of said LSP to reroute said LSP.

10. A computer program product for operating a first node in a label switched network, said computer program product comprising:
    code that establishes a link bundle comprising a plurality of component links between said first node and a second node;
    code that, upon establishment of an LSP including said first node and said second node, selects a first component link of said link bundle as a primary component link to assign to said LSP;
    code that selects one or more component links of said link bundle other than said first component link as one or more secondary component links to assign to said LSP;
    code that sends traffic of said LSP over said primary component link until a failure of said primary component link;
    code that, after failure of said primary component link, sends traffic of said LSP over said one or more secondary component links instead of said primary component link; and
    a computer-readable medium that holds the codes;
    wherein sending traffic of said LSP over said one or more secondary component links comprises assigning lower priority to traffic of said LSP compared to other traffic carried by said one or more secondary component links.

11. The computer program product of claim 10 wherein information about aggregate characteristics of said link bundle is advertised by said first node to other nodes but information about characteristics of individual ones of said plurality of component links is not advertised.

12. The computer program product of claim 10 wherein said one or more secondary component links comprise exactly one secondary component link.

13. The computer program product of claim 12 wherein, in advance of said failure, bandwidth for use by said LSP is allocated on said exactly one secondary component link responsive to a bandwidth requirement of said LSP.

14. The computer program product of claim 12 further comprising:
    code that, while sending traffic of said LSP over said exactly one secondary component link, designates said exactly one secondary component link as a new primary component link and selects a new secondary component link responsive to a bandwidth requirement of said LSP.

15. The computer program product of claim 10 wherein no bandwidth is allocated on said one or more secondary component links for use by said LSP.

16. The computer program product of claim 15 further comprising:
    code that, while traffic of said LSP is sent over said one or more secondary component links, selects a component link of said link bundle as a new pnmary component link; and
    code that sends traffic of said LSP over said new primary component link.

17. The computer program product of claim 16 further comprising:
    if said new primary component link is one of said one or more secondary component links, selecting a new secondary component link.

18. The computer program product of claim 15 further comprising:
    code that, while traffic of said LSP is sent over said one or more secondary component links, searches for a component link of said link bundle to serve a new primary component link; and
    code that, upon failure to identify a component link having sufficient available bandwidth to server as a new primary component link, signals a head-end of said LSP to reroute said LSP.

19. A network device that operates a first node in a label switched network, said network device comprising:
    a processor; and
    a memory device storing instructions executed by said processor, said instructions comprising:
        code that establishes a link bundle comprising a plurality of component links between said first node and a second node;
        code that, upon establishment of an LSP including said first node and said second node, selects a first component link of said link bundle as a primary component link to assign to said LSP;
        code that selects one or more component links of said link bundle other than said first component link as one or more secondary component links to assign to said LSP;
        code that sends traffic of said LSP over said primary component link until a failure of said primary component link; and
        code that, after failure of said primary component link, sends traffic of said LSP over said one or more secondary component links instead of said primary component link;
    wherein sending traffic of said LSP over said one or more secondary component links comprises assigning lower priority to traffic of said LSP compared to other traffic carried by said one or more secondary component links.

20. Apparatus for operating a first node in a label switched network, said apparatus comprising:
    means for establishing a link bundle comprising a plurality of component links between said first node and a second node;
    means for, upon establishment of an LSP including said first node and said second node, selecting a first component link of said link bundle as a primary component link to assign to said LSP;
    means for selecting one or more component links of said link bundle other than said first component link as one or more secondary component links to assign to said LSP;
    means for sending traffic of said LSP over said primary component link until a failure of said primary component link; and
    means for, after failure of said primary component link, sending traffic of said LSP over said one or more secondary component links instead of said primary component link;
    wherein sending traffic of said LSP over said one or more secondary component links comprises assigning lower priority to traffic of said LSP compared to other traffic carried by said one or more secondary component links.

21. The method of claim 1 wherein a head-end of said LSP is unaware of switching traffic of said LSP from said primary component link to said secondary component link.

22. The method of claim 1 wherein selecting said one or more secondary component links comprises selecting said multiple secondary component links on a per-packet basis.

* * * * *